(12) United States Patent
Nasser et al.

(10) Patent No.: US 9,573,403 B1
(45) Date of Patent: Feb. 21, 2017

(54) MESS FREE COLORING SYSTEM

(75) Inventors: Nabil F. Nasser, Dayton, OH (US); Jodi A. Schwendimann, Minnetonka Beach, MN (US); Earl Pickering, Hopkins, MN (US)

(73) Assignee: NuCoat, Inc., Plymouth, MN (US)

( * ) Notice: Subject to any disclaimer, the term of this patent is extended or adjusted under 35 U.S.C. 154(b) by 1076 days.

(21) Appl. No.: 12/556,284

(22) Filed: Sep. 9, 2009

Related U.S. Application Data

(60) Provisional application No. 61/179,152, filed on May 18, 2009, provisional application No. 61/234,033, filed on Aug. 14, 2009.

(51) Int. Cl.
| | | |
|---|---|---|
| *B41M 5/24* | (2006.01) | |
| *C09D 11/00* | (2014.01) | |
| *B32B 5/16* | (2006.01) | |
| *B32B 23/08* | (2006.01) | |
| *C09K 9/02* | (2006.01) | |
| *B41M 5/30* | (2006.01) | |
| *B43L 19/00* | (2006.01) | |
| *B41M 5/40* | (2006.01) | |
| *B41M 5/323* | (2006.01) | |
| *B44C 1/00* | (2006.01) | |
| *C09D 11/0235* | (2014.01) | |

(Continued)

(52) U.S. Cl.
CPC ............ *B41M 5/30* (2013.01); *B41M 5/323* (2013.01); *B41M 5/40* (2013.01); *B43L 19/0018* (2013.01); *B44C 1/005* (2013.01); *B41M 2205/38* (2013.01); *B44D 2/002* (2013.01); *C09D 11/0235* (2013.01); *C09D 11/50* (2013.01); *Y10T 428/24802* (2015.01); *Y10T 428/24835* (2015.01); *Y10T 428/24868* (2015.01); *Y10T 428/24901* (2015.01)

(58) Field of Classification Search
USPC ........ 118/200, 300; 106/31.01, 31.16, 31.19; 503/201; 523/161
See application file for complete search history.

(56) References Cited

U.S. PATENT DOCUMENTS

| | | | | |
|---|---|---|---|---|
| 2,285,122 A | * | 6/1942 | McIntosh .............. | G03F 1/0038 428/138 |
| 3,247,006 A | * | 4/1966 | Hoge et al. ................ | 106/31.16 |
| 4,755,501 A | * | 7/1988 | Chang et al. ................ | 503/207 |

(Continued)

FOREIGN PATENT DOCUMENTS

WO WO 0162511 A2 * 8/2001

*Primary Examiner* — Binu Thomas
(74) *Attorney, Agent, or Firm* — Winthrop & Weinstine, P.A.

(57) ABSTRACT

A mess-free coloring system comprising a coloring medium and optionally one or more coloring utensils is disclosed. The coloring medium can include a substrate with or without decorative effects and one or more coating layers on a surface of the substrate. In various examples, the one or more coating layers include a color-triggering developer, e.g., in the form of a substantially clear resin, and an opaque pigment. Decorative effects integrated with or disposed on the substrate, while initially obscured by the one or more coating layers, can be revealed when the coating layers are mixed with at least one color precursor stored and dispensed from a coloring utensil. The opaque pigment is selected and configured such that, upon receipt of at least one color precursor by the one or more coating layers, a change in the pigment's reflective index occurs as the pigment dissolves into the clear resin developer.

19 Claims, 2 Drawing Sheets

(51) Int. Cl.
*B44D 2/00* (2006.01)
*C09D 11/50* (2014.01)

(56) References Cited

U.S. PATENT DOCUMENTS

| | | | | |
|---|---|---|---|---|
| 5,460,647 | A | * | 10/1995 | Snedeker et al. .......... 106/31.19 |
| 5,485,792 | A | * | 1/1996 | Keyser et al. ............. 106/31.19 |
| 5,814,579 | A | * | 9/1998 | Dotson et al. ................ 503/201 |
| 6,124,377 | A | * | 9/2000 | Kaiser et al. ................ 523/161 |
| 6,228,804 | B1 | * | 5/2001 | Nakashima ................... 503/226 |
| 6,953,345 | B1 | * | 10/2005 | Nakashima et al. .......... 434/408 |
| 7,265,077 | B1 | * | 9/2007 | Netsch et al. ................ 503/201 |
| 7,985,701 | B2 | * | 7/2011 | Nakashima ............ D21H 19/44 428/195.1 |
| 2004/0185234 | A1 | * | 9/2004 | Nakashima et al. ....... 428/195.1 |
| 2005/0075420 | A1 | * | 4/2005 | Stovold ........................ 523/161 |
| 2005/0287356 | A1 | * | 12/2005 | Li et al. ........................ 428/323 |
| 2006/0067896 | A1 | * | 3/2006 | Schaffer ........................ 424/59 |
| 2007/0245926 | A1 | * | 10/2007 | Li et al. ..................... 106/31.27 |
| 2008/0113862 | A1 | * | 5/2008 | Stovold et al. ............... 503/204 |
| 2008/0157517 | A1 | * | 7/2008 | Masuda ........................ 283/72 |
| 2008/0246272 | A1 | * | 10/2008 | Vast et al. ..................... 283/94 |

* cited by examiner

MESS FREE COLORING SYSTEM

CLAIM OF PRIORITY

This non-provisional patent application claims the benefit of priority under 35 U.S.C. §119(e) to U.S. Provisional Patent Application Ser. No. 61/179,152, entitled "MESS-FREE COLORING SYSTEM," filed on May 18, 2009, and U.S. Provisional Patent Application Ser. No. 61/234,033, also entitled "MESS-FREE COLORING SYSTEM," filed on Aug. 14, 2009, the specifications of which are herein incorporated by reference in their entirety.

TECHNICAL FIELD

This patent document pertains generally to coloring systems. More particularly, but not by way of limitation, this patent document pertains to a mess-free coloring system that inhibits color markings from appearing on unintended surfaces or objects, and which includes and reveals a decorative layer upon receiving one or more markings.

BACKGROUND

Artwork and the creation of artwork can be an important developmental tool for children. For example, coloring utensils including colored or tinted pigments, such as crayons, paints and markers, are often given to children for painting, drawing or other marking purposes in order to stimulate their creativity and imagination.

A drawback with conventional coloring utensils is that their pigments tend to be messy in use. For this reason, parents and other supervisory figures often limit the use of coloring utensils (e.g., crayons, paints and markers) by children because of the possibility that household objects, such as carpet and furniture, as well as skin and clothing, may be stained by the colored pigments. The inherent messiness of known coloring utensils is exacerbated by the fact that undesirable stains can be, and often are, difficult to remove.

OVERVIEW

The present inventors have recognized, among other things, that there is a need for a coloring system that is substantially non-staining to household objects and other unintended surfaces, and which includes the use of decorative features (e.g., holographics, glass bead effects, glitter or sparkle effects, metallic effects, luminescent effects, or pearlescent effects) in addition to an imparted image or other marking. The present inventors have further recognized that the coloring system should be non-toxic, simple to use, inexpensive to manufacture, and capable of rapidly generating various tinted colors against a holographic, pearlescent, metallic or other decorative background. It is believed that the sharp and bright images made possible through the use of holographics, for example, will provide hours of fun for users and allow for continual and creative end-product uses, including wall hangings, wrapping paper, and greeting cards.

A mess-free coloring system comprising a coloring medium is disclosed. The coloring medium can include a substrate with or without decorative effects and one or more coating layers on a major surface or surface portion of the substrate. In various examples, the one or more coating layers include a color-triggering developer and an opaque pigment. Decorative effects integrated with or disposed on the substrate, if present, are visible on a major substrate surface upon receiving one or more imparted markings by a user. A holographic or crystal coating pattern, for example, while initially obscured by the one or more coating layers, can be revealed when the color-triggering developer and the opaque pigment are mixed with at least one color precursor stored and dispensed from a coloring utensil.

The inclusion of a decorative background to one or more imparted markings, which are created using a mess-free coloring system, requires technological advances not previous needed or conceived. For instance, upon application of the at least one color precursor to the one or more coating layers, not only must the color-triggering developer serve as a chemical activator for the conversion of the at least one color precursor into tinted chromophores, but the opaque pigment initially obscuring the decorative background must become substantially transparent at locations contacted by the at least one color precursor. As such, the present inventors have conceived a combination of a color-triggering developer including, at least in part, a substantially clear resin and an opaque pigment. The opaque pigment is selected and configured such that, upon receipt of at least one color precursor by the one or more coatings, a change in the pigment's reflective index occurs as the pigment dissolves into the substantially clear resin developer. In various examples, the pigment's reflective index drops below a value of about 2.65, preferably between about 1.2 and 2.2, and most preferably between about 1.33 to 1.85. Together, the substantially clear resin developer and the post-marking transparent pigment allow the decorative background to be revealed.

To better illustrate the coloring systems and mediums disclosed herein, a non-limiting list of examples is provided here:

In Example 1, a mess-free coloring system comprises a coloring utensil, the coloring utensil configured to store and/or dispense at least one color precursor; and a coloring medium, including a substrate having a surface; and one or more coating layers disposed above the surface of the substrate and including a color-triggering developer and an opaque pigment, the one or more coating layers obscuring at least a portion of the surface, wherein, upon application of the at least one color precursor to the one or more coating layers, the initially opaque pigment becomes substantially transparent, revealing a portion of the surface, and a colored marked is formed.

In Example 2, the coloring system of Example 1 is optionally configured such that the one or more coating layers comprise a resin developer layer including a first portion of the color-triggering developer and a color forming layer including, in part, a second portion of the color-triggering developer and the opaque pigment.

In Example 3, the coloring system of Example 2 is optionally configured such that the opaque pigment is configured to change in reflective index and dissolve into the color-triggering developer upon application of the at least one color precursor to the one or more coating layers.

In Example 4, the coloring system of Example 3 is optionally configured such that the change in reflective index is to a value less than about 2.65.

In Example 5, the coloring system of any one or any combination of Examples 1-4 is optionally configured such that the color-triggering developer includes a substantially clear resin developer having a total coat weight between about 3 grams per square meter to less than 16 grams per square meter.

In Example 6, the coloring system of any one or any combination of Examples 1-5 is optionally configured such that the color-triggering developer is configured to serve as a chemical activator or initiator for the conversion of the at least one color precursor into chromophores containing dye that display one or more colors.

In Example 7, the coloring system of any one or any combination of Examples 1-6 is optionally configured such that the opaque pigment includes a non-zinc based pigment.

In Example 8, the coloring system of any one or any combination of Examples 1-7 is optionally configured such that the substrate includes one or more integrated decorative effects visible on the surface of the substrate when the initially opaque pigment becomes substantially transparent upon application of the at least one color precursor to the one or more coating layers.

In Example 9, the coloring system of any one or any combination of Examples 1-8 optionally further comprises a distinct decorative layer disposed on one or more portions of the surface of the substrate, below the one or more coating layers including the color-triggering developer and the opaque pigment.

In Example 10, the coloring system of any one or any combination of Examples 1-9 is optionally configured such that the coloring utensil is selected from the group consisting of a marker, a paint brush, a pencil, a pen, a stamp, a crayon, or a finger paint storage container.

In Example 11, the coloring system of any one or any combination of Examples 1-10 is optionally configured such that the at least one color precursor includes a leuco dye.

In Example 12, the coloring system of any one or any combination of Examples 1-11 is optionally configured such that the at least one color precursor is dissolved in at least one solvent to form, at least in part, a composition, the at least one solvent present in a concentration of about 25% to about 90% of the composition.

In Examples 13, the coloring system of Example 12 is optionally configured such that the at least one color precursor is present in a concentration of about 0.1% to about 20% by weight of the composition.

In Example 14, a mess-free coloring system comprises a coloring medium, including a substrate having a surface; a decorative effect integrated with the substrate or disposed on a portion of the surface of the substrate; and one or more coating layers disposed above the decorative effect and including a color-triggering developer and an opaque pigment, the one or more coating layers obscuring at least a portion of the decorative effect, wherein, upon application of at least one color precursor to the one or more coating layers, the initially opaque pigment becomes substantially transparent having a reflective index below about 2.65, revealing a portion of the decorative effect, and a colored marked is formed.

In Example 15, the coloring system of Example 14 optionally further comprises a coloring utensil configured to store and/or dispense the at least one color precursor.

In Example 16, the coloring system of any one or any combination of Examples 14 or 15 is optionally configured such that the opaque pigment includes at least one of a clay or calcium carbonate.

In Example 17, the coloring system of any one or any combination of Examples 14-16 is optionally configured such that the substrate includes a holographic pattern visible on the surface of the substrate when the initially opaque pigment becomes substantially transparent upon application of the at least one color precursor to the one or more coating layers.

In Example 18, the coloring system of any one or any combination of Examples 14-17 is optionally configured such that the decorative effect is provided by a distinct decorative layer disposed on one or more portions of the surface of the substrate, the decorative layer including at least one of pearlescent materials, metallic materials, sparkle materials, glitter materials, or luminescent materials.

In Example 19, a mess-free coloring system comprises a coloring utensil, the coloring utensil configured to store and/or dispense a color-trigger developer; and a coloring medium, including a substrate having a surface; and one or more coating layers disposed above the surface of the substrate and including at least one color precursor, wherein the color-triggering developer and the color precursor, when mixed, are configured to tint a portion of the surface.

In Example 20, the coloring system of Example 19 is optionally configured such that the substrate includes one or more integrated decorative effects visible on the surface of the substrate when the color-triggering developer and the at least one color precursor are mixed.

In Example 21, the coloring system of any one or any combination of Examples 19 or 20 optionally further comprises a distinct decorative layer disposed on one or more portions of the surface of the substrate, below the one or more coating layers including the at least one color precursor.

In Example 22, the coloring system of any one or any combination of Examples 1-21 is optionally configured such that all elements or options recited are available to use or select from.

These and other examples, advantages, and features of the present coloring systems and mediums will be set forth in part in the following Detailed Description. This Overview is intended to provide non-limiting examples of the present subject matter—it is not intended to provide an exclusive or exhaustive explanation of the present subject matter. The Detailed Description is included to provide further information about the coloring systems and mediums disclosed in the present patent document.

BRIEF DESCRIPTION OF THE DRAWINGS

In the drawings, like numerals have been used to describe similar components throughout the several views. Like numerals having different letter suffixes have been used to represent different instances of similar components. The drawings illustrate generally, by way of example, but not by way of limitation, various embodiments discussed in the present document.

DETAILED DESCRIPTION

In this patent document, a mess-free coloring system is disclosed. In various examples, the system includes a coloring medium upon which an image or other marking can be imparted and captured. The coloring medium includes a substrate, which in many examples includes decorative effects, and one or more coating layers on a surface of the substrate. In some examples, the one or more coating layers include a color-triggering developer, in the form of a substantially clear resin, and an opaque pigment. In some examples, the system further includes one or more coloring utensils used to generate an image or marking on the coloring medium. The coloring utensils can store and/or optionally dispense at least one color precursor, such as a leuco dye, for application onto the coatings of the coloring medium. The at least one color precursor can be configured to not exhibit a tinted or colored nature until received by the color-triggering developer of the coloring medium. Accordingly, the color precursor does not stain or create a mess when spilled or applied to an object other than the intended coated coloring medium.

Mixing the at least one color precursor and the one or more coating layers not only creates tinted markings on the coloring medium, but can also reveal a decorative background to the markings. For instance, upon application of the at least one color precursor to the coating layers, not only can the color-triggering developer serve as a chemical activator for the conversion of the at least one color precursor into tinted chromophores, but an opaque pigment initially obscuring the decorative background can become substantially transparent at locations contacted by the at least one color precursor. This is made possible by the selection and configuration of an opaque pigment and its incorporation into the one or more coating layers. In various examples, the opaque pigment is selected and configured such that, upon receipt of at least one color precursor by the coating layers, a change in the pigment's reflective index occurs, preferably to a value between about 1.2 and 2.2 or between about 1.33 to 1.85, as the pigment dissolves into the substantially clear resin developer. Together, the substantially clear resin developer and the post-marking transparent pigment can allow the decorative background to be revealed when the tinted markings, corresponding to a selected color of the at least one color precursor used, are created.

In some examples, the one or more coloring utensils include a color-triggering developer, while the one or more coating layers of the coloring medium include at least one color precursor. Regardless of whether the color-triggering developer is disposed in one or more substrate coating layers or the coloring utensil and whether the at least one color precursor is in one or more substrate coating layers or the coloring utensil, when the color-triggering developer and the at least one color precursor mix, a tinted mark on the coloring medium can result. Furthermore, when an opaque pigment and the at least one color precursor mix, a change in the pigment's reflective index occurs as the pigment dissolves into the developer. As a result, the opaque pigment, which initially obscures a decorative background, becomes substantially transparent at locations contacted by the color precursor.

Figure 1:
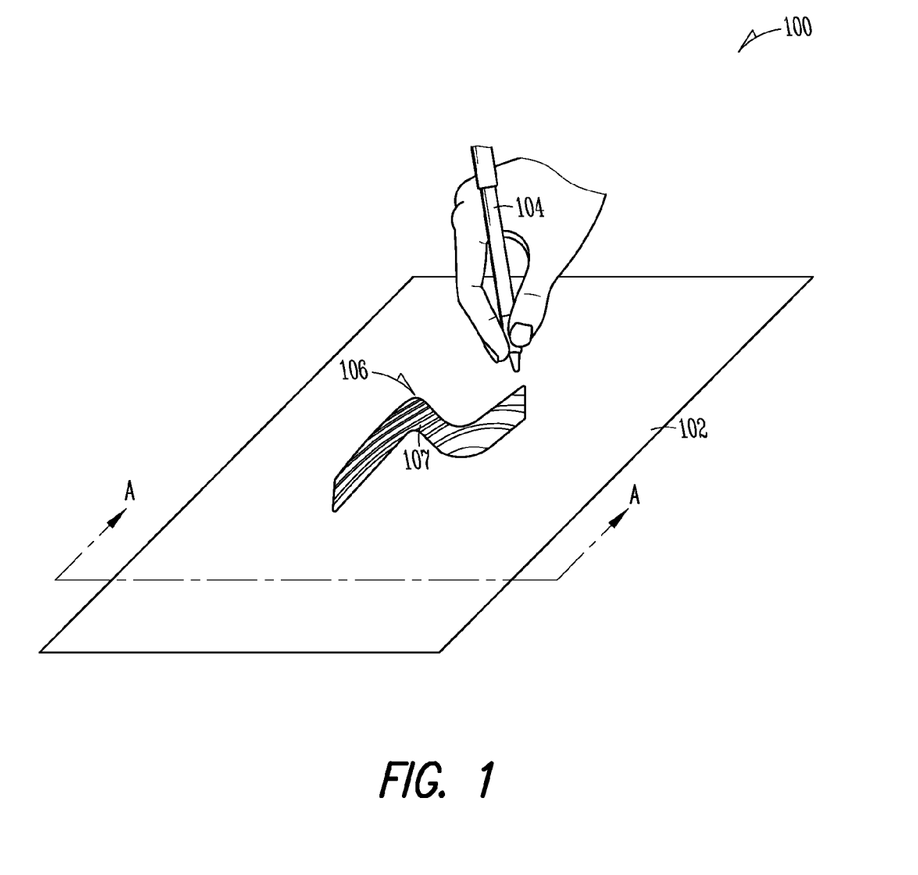
FIG. 1 illustrates an example coloring system including a coloring medium and a coloring utensil.

FIG. 1 illustrates a mess-free coloring system 100 according to one embodiment of the present subject matter. The system 100 includes a coloring medium 102 and a coloring utensil 104. An image or other marking can be created on the coloring medium 102 by applying a dispensing tip of the coloring utensil 104 to the coloring medium 102 in a similar way as one would apply a pen or pencil tip to a piece of paper when writing or drawing. The coloring utensil 104 can include at least one color precursor, such as a leuco dye, that reacts with a color-triggering developer in one or more coatings of the coloring medium 102 to produce a tinted mark 106. In the illustrated example, the coloring medium 102 includes a decorative background pattern 107 that is revealed when the coloring utensil 104 is contacted with the one or more medium coating layers to create the tinted mark 106. In various examples, the system 100 includes multiple coloring utensils 104, each utensil configured to produce a different tint of color when the at least one color precursor of the coloring utensil 104 is applied to the one or more coating layers of the coloring medium 102.

In some examples, the one or more coloring utensils 104 are in the form of markers, pencils, pens or crayons, which are configured to store and/or dispense at least one color precursor. In some examples, the at least one color precursor is contained in a bottle or jar and the one or more coloring utensils 104 are in the form of a brush, stamp or a user's finger. As desired, the brush, stamp or user's finger can be dip coated into the at least one color precursor and thereafter applied to the coloring medium 102.

Figure 2:
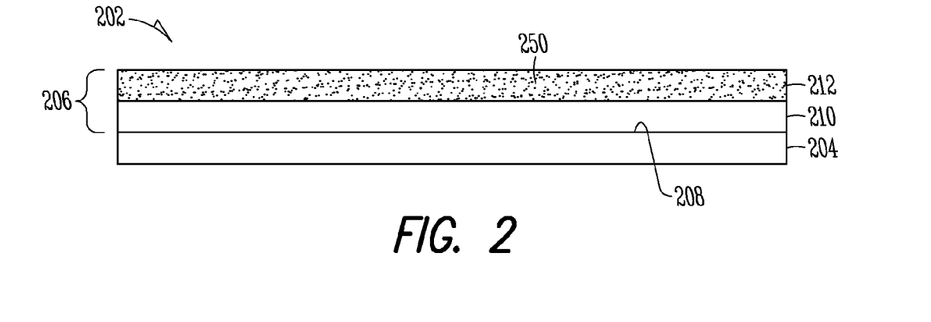
FIG. 2 illustrates an example cross-sectional view of a coloring medium coated with a color-triggering developer and an opaque pigment taken along a line perpendicular to a length of the medium, such as along a line similar to A-A of FIG. 1.

FIG. 2 illustrates a cross-sectional view of a coloring medium 202 taken along a line similar to line A-A of FIG. 1, according to at least one embodiment of the present subject matter. As shown, the coloring medium 202 can take the form of a sheet material, such as a film-like material. In various examples, the sheet material includes a substrate 204 having one or more coating layers 206. The one or more coating layers 206 are disposed above a surface 208 of the substrate 204 and include a color-triggering developer and an opaque pigment. The opaque pigment serves to obscure at least a portion of the surface 208 until mixed with a color precursor. Upon application of at least one color precursor to the one or more coating layers 206, the initially opaque pigment becomes substantially transparent, revealing a portion of the surface 208, and a color marked is formed.

In various examples, the one or more layers 206 comprise a resin developer layer 210 including a first portion of the color-triggering developer and a color forming layer 212 including a second portion of the color-triggering developer and the opaque pigment 250. The color-triggering developer can include a substantially clear resin, which serves as a chemical activator or initiator for a conversion of the at least one color precursor into chromophores containing dye that can display bold and vivid colors. The opaque pigment 250 can be configured to change in reflective index and dissolve into the color-triggering developer upon application of the color precursor to the one or more coating layers 206. In some examples, the change in reflective index is to a value less than about 2.65, preferably between about 1.2 and 2.2, and most preferably between about 1.33 to 1.85. In some examples, the opaque pigment 250 includes a non-zinc based pigment, such as a clay, exsilon slurry or calcium carbonate.

Optionally, the one or more layers 206 can further or alternatively include some combination of a kaolin clay, a defoamer, a pigment shock reducer, such as for paper coating formulations, an anhydrous aluminum silicate, a starch styrene/butadiene polymer binder, a cross linking agent, a dye blocker, a void cell former, or a resin or other dye developer. A binder, for example, can be used to retain coating layer components on the substrate 204. A dye blocker, for example, can be used to prevent or inhibit color development on certain portions of the substrate 204. The dye blocker can be provided in the form of a novolac epoxy or a tannic acid. A void cell former, for example, can be formed to provide a void cell in the one or more layers 206. The void cell can function by capillary action and be configured to hold dye in a cell to prevent penetration into and across the substrate 204, thereby preventing or inhibiting smearing of dye.

In some examples, the dye developer includes alkalized zinc salicylate, such as HRJ-14508 available from S.I. Group, and is included in the resin developer layer 210. It is to be understood that other dye developer agents are possible without departing from the scope of the present subject matter. For instance, other possible dye developer agents include, but are not limited to, D-8, zinc chloride, benzyl paraben, phenolic resins, biphenyls and acidic clays, amindophenol, anilides and benzoamides with a hydroxyl group including N-(4-Hydroxyphenyl) acetamide, 2-Acetamidophenol, 3-acetemidophenol, salicylanilide, p-hydroxybenzamide, p-hydroxyphenyl acetamide, 3-Hydroxy-2-Napthanilide or o-hydroxybenzanilide, and combination thereof.

In various examples, the one or more layers 206 are applied to the substrate 204 in one or more coating passes. In some examples, the one or more layers 206 are coated uniformly over the entire surface 208 of the substrate 204. In other examples, the one or more layers 206 are selectively coated to portions of the substrate 204. In some examples, the one or more layers 206 are coated in a pattern on the substrate 204. In some examples, the one or more layers 206 are coated on the substrate 204 in a concentration of at least about 8 grams or at least about 10 grams of dry coating per square meter of substrate 204. In some examples, the color-triggering developer is coated on the substrate 204 in a concentration of at least 3 grams per square meter, such as between about 3 grams per square meter to less than 16 grams per square meter.

In the example illustrated, the substrate 204 is coated on a surface 208 using a two-pass process, in which the second pass forms a coating exhibiting opaque or translucent properties prior to receiving imparted user markings. The first pass applies a layer 210 of resin developer. In some examples, the resin developer is present in a concentration of at least about 10% by weight of the layer to achieve desired color intensity when contacted by at least one color precursor. The second pass can apply a layer 212 of color forming materials, such as a solution including water, a kaolin clay, a defoamer, a pigment shock reducer, a nonionic hydrophobic surfactant, anhydrous aluminum silicate, a starch styrene/butadiene polymer binder, a cross-linking agent, a resin or other dye developer or some combination thereof. In various examples, the total resin developer present in layers 210 and 212, relative to the total weight percent of all materials in these layers, is between about 5% to about 97%, and preferably between about 20% to about 80%.

The opaque or translucent nature of the one or more layers 206, including a color-triggering developer and an opaque pigment 250, are configured to reveal the surface 208 of the substrate 204 when combined or otherwise mixed with at least one color precursor, such as a precursor stored or dispensed from one or more coloring utensils 104 (FIG. 1). In various examples, the at least one color precursor includes a dye and optionally a plasticizer, the latter of which can facilitate the ability of the dye to penetrate the one or more layers 206 allowing for faster color-formation reaction. Application of the at least one color precursor to the one or more coating layers 206 results in the color-triggering developer serving as a chemical activator for the conversion of the color precursor into tinted chromophores, and further results in the initially opaque pigment 250 becoming substantially transparent at locations contacted by the color precursor. In some examples, the one or more coloring utensils 104 include a leuco dye, for example, leuco dyes including an activator, such as those supplied by Hilton Davis (Emerald Performance Materials), including one or more of COPIKEM® 1, COPIKEM® 4, COPIKEM® 14, COPIKEM® 3, COPIKEM® 20, COPIKEM® 34, COPIKEM® 37, or supplied by Ciba-Geigy, including one or more of PERGASCRIPT® Blue I-2G, PERGASCRIPT® Yellow I-3R, PERGASCRIPT® Orange I-5R, PERGASCRIPT® Blue I-2R, PERGASCRIPT® Green I-2GN, PERGASCRIPT® Olive I-G, and PERGASCRIPT® Black I-R. It is to be understood that other combinations of the one or more layers 206 with other leuco dyes is possible without departing form the scope of the present subject matter.

In various examples, the at least one color precursor is dissolved in at least one solvent to form, at least in part, a composition. The at least one solvent is used as a carrier or vehicle for the color precursor(s). In some examples, the solvent (or combination of solvents) is substantially optically clear and is selected such that the solubilized precursor gives good color formation when reacted with the color-triggering developer of the one or more coating layers 206 on the coloring medium 202. By way of example, the at least one solvent for carrying the color precursor can be selected from dimethyl adipate, diethyl succinate, dibutyl phthalate, chlorinated and fluorinated toluenes, such as parachlorobenzotrifluoride, or combinations thereof. In some examples, the at least one solvent is present in a concentration of about 25% to about 90% by weight of the composition, such as about 50% to about 80%. In other examples, the at least one color precursor is present in a concentration of about 0.1% to about 20% by weight of the composition, such as about 0.5% to about 6%.

In various examples, the substrate 204 includes an integrated decorative background, such as a colored background or a background image or design. In some examples, the background of the substrate 204 includes one or more holographic features, collectively forming a holographic pattern. The holographic features, when revealed through the contacting of the at least one color precursor and the color-triggering developer and opaque pigment 250, can provide an attractive and captivating appearance for use in wall hangings, wrapping paper, and greeting cards, for example. The layers of the substrate 204 can be configured to produce holographic features of various spectral colorings, designs, and light reflection properties. In some examples, the sheet material includes an oriented polypropylene (OPP) holographic film.

Figure 3:
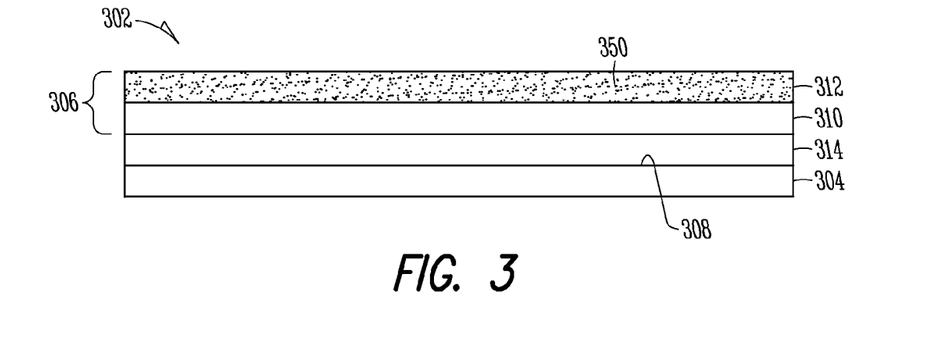
FIG. 3 illustrates another example cross-sectional view of a coloring medium coated with a color-triggering developer and an opaque pigment taken along a line perpendicular to a length of the medium, such as along a line similar to A-A of FIG. 1.

In various examples, such as is illustrated in FIG. 3, the substrate can be coated with a layer including decorative effects, such as glitter or sparkle materials, metallic materials, luminescent materials or pearlescent materials. FIG. 3 illustrates a cross-sectional view of a coloring medium 302 taken along a line similar to line A-A of FIG. 1, according to at least one embodiment of the present subject matter. Similar to the example of FIG. 2, the coloring medium 302 is shown in the form of a sheet material; however, the present subject matter is not so limited. Optionally, the coloring medium 302 can include art foam or other non-sheet-like materials. The coloring medium 302 can include a substrate 304 coated with a distinct decorative layer 314 on a surface 308.

One or more layers 306 providing an opaque or translucent coating can be applied over a surface of the distinct decorative layer 314. In various examples, the one or more layers 306 include a color-triggering developer and an opaque pigment. The opaque pigment serves to obscure at least a portion of the surface of the decorative layer 314 until mixed with a color precursor. Upon application of at least one color precursor to the one or more coating layers 306, the initially opaque pigment becomes substantially transparent, revealing a portion of the decorative layer 314, and a color marked is formed.

In various examples, the one or more layers 306 comprise a resin developer layer 310 including a first portion of the color-triggering developer and a color forming layer 312 including a second portion of the color-triggering developer and the opaque pigment 350. The color-triggering developer can include a substantially clear resin, which serves as a chemical activator or initiator for a conversion of the at least one color precursor into chromophores containing dye that can display bold and vivid colors. In various examples, the total resin developer present in layers 310 and 312, relative to the total weight percent of all materials in layers 310, 312 and 314, is between about 5% to about 97%, and preferably between about 20% to about 80%. The opaque pigment 350 can be selected and configured to become substantially transparent and change in reflective index, by dissolving into the color-triggering developer, upon application of the color precursor to the one or more coating layers 306. Together, the presently disclosed combination of a substantially clear resin developer and a post-marking transparent pigment allow the decorative layer 314 to be revealed where marked with color precursor.

In various examples, the one or more layers 306 are applied to the surface of the decorative layer 314 in one or more coating passes. In some examples, the one or more layers 306 are coated uniformly over the entire surface of the decorative layer 314. In other examples, the one or more layers 306 are selectively coated to portions of the decorative layer 314. In some examples, the one or more layers 306 are coated in a pattern on the decorative layer 314.

In various examples, the distinct decorative layer 314 provides a background with glitter-like, sparkle-like, metallic-like, luminescent, pearlescent or other decorative features through the incorporation of elements such as, but not limited to, metallic-like flakes, glitter materials, sparkle materials, luminescent materials (e.g., having a glow-in-the-dark effect), pearlescent materials, reflective materials, or combinations thereof. The decorative layer 314 can be coated with a resin developer layer 310 and a color forming layer 312, as discussed above, such that application of a color precursor, such as a leuco dye, via a coloring utensil 104 (FIG. 1) reveals features of the decorative layer 314 and tints such layer a selected color. The system is mess-free because the color precursor is substantially clear and does not tint an object unless the object includes color-triggering developer, such as the resin developer layer 310 and the color forming layer 312.

In some examples, the decorative layer 314 can include pearlescent materials such that when the one or more coating layers 306 and at least one color precursor mix, pearlescent effects of the decorative layer 314 are visible along with one or more imparted tinted marks. In some examples, the pearlescent decorative layer 314 includes a urethane polymer and a pearlescent pigment, such as coated mica particles. In some examples, the pearlescent decorative layer 314 includes an ethoxylated non-ionic fluorosufactant in addition to the urethane polymer and pearlescent pigment. Optionally, the pearlescent decorative layer 314 can include iridescent-effect inorganic particles detectable via light or temperature.

In some examples, the decorative layer 314 can include metallic or metallic-type materials (e.g., titanium oxide and/or dioxide coated mica) such that when the one or more coating layers 306 and at least one precursor mix, metallic effects of the decorative layer 314 are visible along with one or more imparted tinted marks. In some examples, the metallic decorative layer 314 can include a urethane polymer, a pearlescent pigment or carbon black. In some examples, the metallic decorative layer 314 can include an ethoxylated non-ionic fluorosufactant in addition to the urethane polymer, pearlescent pigment or carbon black.

In some examples, the decorative layer 314 can include sparkle materials such that when the one or more coating layers 306 and at least one precursor mix, sparkle effects of the decorative layer 314 are visible along with one or more imparted tinted marks. In some examples, the decorative layer 314 can include a urethane polymer and the sparkle material. In some examples, the sparkle material includes metallic or metallic-like particles with particle sizes of about 0.004 inches or less. In some examples, the sparkle material includes coated aluminum metalized polyethylene terephthalate particles. In some examples, the decorative sparkle layer 314 includes an ethoxylated non-ionic fluorosufactant in addition to the urethane polymer and sparkle material.

In some examples, the decorative layer 314 can include glitter materials such that when the one or more coating layers 306 and at least one precursor mix, glitter effects of the decorative layer 314 are visible along with one or more imparted tinted marks. In some examples, the decorative layer 314 includes a glitter material having particle sizes of about 0.002 inches, for example. In some examples, the glitter material can include coated aluminum metalized polyethylene terephthalate particles. In some examples, the decorative layer 314 can include luminescent materials such that the imparted marks or portions thereof, glow in the dark. Such luminescent materials can include fluorescent and/or phosphorescent material (e.g., alkaline earth aluminates). In some examples, the decorative layer 314 can include both glitter particles and glow pigment.

Figure 4:
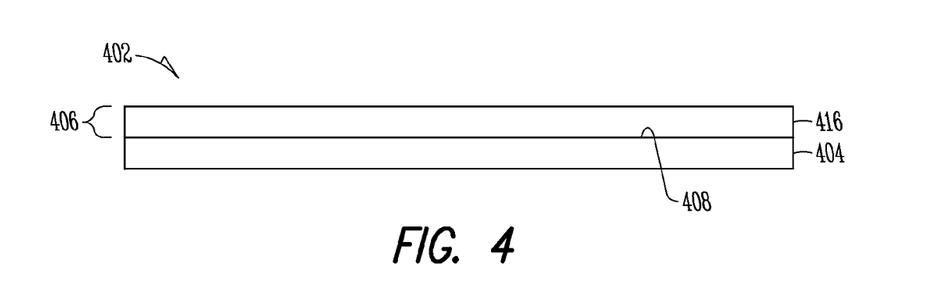
FIG. 4 illustrates another example cross-sectional view of a coloring medium coated with at least one color precursor taken along a line perpendicular to a length of the medium, such as along a line similar to A-A of FIG. 1.

FIG. 4 illustrates a cross-sectional view of a coloring medium 402 taken along a line similar to line A-A of FIG. 1, according to at least one embodiment of the present subject matter. As shown, the coloring medium 402 can take the form of a sheet material. In various examples, the sheet material includes a substrate 404 having one or more coating layers 406. In some examples, the one or more layers 406 include at least one color precursor layer 416, which, when combined with a color-triggering developer of a coloring utensil 104 (FIG. 1), tints decorative features integrated with or coated on the substrate 404 a selected color. In some examples, the one or more layers 406 are applied uniformly over an entire surface 408 of the substrate 404. In other examples, the one or more layers 406 are selectively applied to portions of the substrate 404. In some examples, the one or more layers 406 are applied in a pattern on the substrate 404.

As discussed above, regardless of whether the color-triggering developer is disposed in one or more substrate coating layers or the coloring utensil and whether the at least one color precursor is in one or more substrate coating layers or the coloring utensil, when the color-triggering developer and the at least one color precursor mix, a tinted mark on the coloring medium can result. In each instance, the color-triggering developer can serve as a chemical activator or initiator for a conversion of at least one color precursor into chromophores containing dye that can display bold and vivid colors.

EXPERIMENTAL EXAMPLE

In order that the present mess-free coloring system can be more fully understood, the following example is given by way of illustration but not limitation.

|  |  | Coat Weight (grams per square meter (gsm) dry) | Coating Solids |
|---|---|---|---|
| Resin Developer Layer (210) | Formula A | In some examples, between about 2.5 gsm dry to about 40 gsm dry | 45.00% |
| Color Forming Layer (212) | Formula B | In some examples, between about 1.5 gsm dry to 45 gsm; in some examples, more preferably, between about 3 gsm to 20 gsm | 41.00% |

EXPERIMENTAL FORMULAS

Formula A

| Raw Material | Weight Percentage |
|---|---|
| Resin Developer | 100% |
| Solids: 43% to 47% | |

Formula B

| Raw Material | Wet Weight Percentage |
|---|---|
| Exsilon or Clay Slurry | 0%-55%, preferably 33% to 37% |
| Defoamer | 0%-2% |
| Kaocal Slurry | 3%-45%, preferably 11% to 15% |
| Surfactant | 0% to 2% |
| Starch/Latex Binder | 4% to 45%, preferably 11% to 15% |
| Crosslinker | 0% to 2% |
| Resin Developer | 14% to 18% |
| Water (Reverse Osmosis) | 19.5% to 23.5% |
| Solids: 39%-43% | |

Closing Notes:

A mess-free coloring system comprising a coloring medium is disclosed. The coloring medium can include a substrate with or without decorative effects and one or more coating layers on a surface or surface portion of the substrate. In various examples, the one or more coating layers include a color-triggering developer and an opaque pigment. Decorative effects integrated with or disposed on the substrate, if present, are visible on a surface upon receiving one or more imparted markings by a user. A holographic pattern, for example, while initially obscured by the one or more coating layers, can be revealed when a color-triggering developer, e.g., in the form of a substantially clear resin, and an opaque pigment is mixed with at least one color precursor stored and dispensed from a coloring utensil. The color-triggering developer operates chemically with the color precursor to produce a chromophore resulting in a visible color on the substrate.

The inclusion of a decorative background to one or more imparted markings, which are created using a mess-free coloring system, requires technological advances not previously needed or conceived. For instance, upon application of the at least one color precursor to the one or more coating layers, not only must the color-triggering developer serve as a chemical activator for the conversion of the at least one color precursor into tinted chromophores, but an opaque pigment initially obscuring the decorative background must become substantially transparent at locations contacted by the at least one color precursor. As such, the present inventors have conceived a combination of a color-triggering developer including a substantially clear resin and an opaque pigment. The opaque pigment is selected and configured such that, upon receipt of at least one color precursor by the one or more coatings, a change in the pigment's reflective index occurs as the pigment dissolves into the substantially clear resin developer. Together, the substantially clear resin developer and the post-marking transparent pigment allow the decorative background to be revealed.

The coloring utensils can be in any of a number of different forms, including a marker, a pencil, a pen, a crayon or paint. Writing or otherwise marking the one or more coating layers of the substrate produces color on the substrate corresponding to the selected color of the at least one color precursor (e.g., color of the leuco dye) dispensed via the coloring utensil. Advantageously, the at least one color precursor is substantially colorless until it is mixed with the color-triggering developer. Accordingly, little or no colored mark is developed by contacting the coloring utensil with surfaces other than the coated substrate surface, such as skin, clothing, carpeting, walls or other household surfaces.

The above Detailed Description includes references to the accompanying drawings, which form a part of the Detailed Description. The drawings show, by way of illustration, specific embodiments in which the invention can be practiced. These embodiments are also referred to herein as "examples." Trade names for certain materials may be referred to herein. The present subject matter is not intended to be limited by the materials described and referenced by a particular trade name. Equivalent materials may be substituted and utilized in the apparatus and methods described herein without departing from the scope of the present subject matter.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, references to "an," "one," or "various" embodiments are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

In the appended claims, the terms "including" and "in which" are used as the plain-English equivalents of the respective terms "comprising" and "wherein." Also, in the following claims, the terms "including" and "comprising" are open-ended, that is, a system, assembly, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A mess-free coloring system, comprising:
   a coloring medium, including:
      a substrate having a surface; and
      a coating layer disposed above the surface of the substrate, the coating layer including a color-triggering developer and a visually opaque pigment, the coating layer visually obscuring at least a portion of the surface of the substrate;
   a color precursor composition, comprising a color precursor, and formulated such that upon application of the color precursor composition to the coating layer, contact between the color precursor composition and the visually opaque pigment causes the initially visually opaque pigment to change in reflective index as it dissolves into the color-triggering developer, thereby becoming more visually transparent as compared to its state before contact with the color precursor composition, revealing at least a portion of the surface of the substrate initially visually obscured by the coating layer, and contact between the color precursor composition and the color-triggering developer chemically activates or initiates the conversion of the color precursor into chromophores to form and substantially permanently capture a colored mark on the coloring medium.

2. The coloring system of claim 1, wherein the coating layer comprises at least two sub-layers, one of the sub-layers being a resin developer layer including the color-triggering developer, the other sub-layer being disposed over the resin developer layer.

3. The coloring system of claim 1, wherein the change in reflective index is to a value less than about 2.65.

4. The coloring system of claim 1, wherein the color-triggering developer includes a clear resin developer having a total coat weight between about 3 grams per square meter to less than 16 grams per square meter.

5. The coloring system of claim 1, wherein the color-triggering developer includes a clear resin developer having a total coat weight accounting for about 5% to about 97% of the coat weight of the coating layer.

6. The coloring system of claim 1, wherein the visually opaque pigment includes a non-zinc based pigment.

7. The coloring system of claim 1, wherein the substrate includes one or more decorative effects integrated with the substrate or disposed on at least a portion of the surface of the substrate, the one or more decorative effects being visible on the surface of the substrate when the initially opaque pigment becomes more transparent upon application of the color precursor composition to the coating layer.

8. The coloring system of claim 1, further comprising a distinct decorative layer disposed on one or more portions of the surface of the substrate, below the coating layer.

9. The coloring system of claim 1, wherein the color precursor includes a leuco dye.

10. The coloring system of claim 1, wherein the color precursor composition comprises a color precursor dissolved in at least one solvent, the at least one solvent present in a concentration of about 25% to about 90% by weight of the composition.

11. The coloring system of claim 10, wherein the color precursor is present in a concentration of about 0.1% to about 20% by weight of the color precursor composition.

12. The coloring system of claim 1, wherein the opaque pigment includes at least one of a clay, an exsilon slurry, or a calcium carbonate.

13. A mess-free coloring system, comprising:
    a coloring medium, including:
       a substrate having a surface;
       a decorative effect integrated with the substrate or disposed on a portion of the surface of the substrate; and
       a coating layer disposed above the decorative effect, the coating layer including a color-triggering developer and an opaque pigment, the coating layer obscuring at least a portion of the decorative effect;
    a color precursor composition, comprising a color precursor, and formulated such that upon application of the color precursor composition to the coating layer, contact between the color precursor composition and the opaque pigment causes the initially opaque pigment to change to a reflective index of below about 2.65 as it dissolves into the color-triggering developer, thereby becoming more transparent as compared to its state before contact with the color precursor composition, revealing a portion of the decorative effect, and contact between the color precursor composition and the color-triggering developer chemically activates or initiates the conversion of the color precursor into chromophores to form and substantially permanently capture a colored mark on the coloring medium.

14. The coloring system of claim 13, further comprising a coloring utensil configured to store or dispense the color precursor composition.

15. The coloring system of claim 14, wherein the coloring utensil is selected from the group consisting of a marker, a paint brush, a pencil, a pen, a stamp, a crayon, or a finger paint storage container.

16. The coloring system of claim 13, wherein the opaque pigment includes at least one of a clay or calcium carbonate.

17. The coloring system of claim 13, wherein the decorative effect comprises at least one of: a holographic pattern visible when the initially opaque pigment becomes more transparent upon application of the color precursor composition to the coating layer; or a distinct decorative layer disposed on one or more portions of the surface of the substrate, the decorative layer including at least one of pearlescent materials, metallic materials, sparkle materials, glitter materials, or luminescent materials.

18. A mess-free coloring system, comprising:
    a coloring medium, including:
       a substrate having a surface;
       a decorative effect integrated with the substrate or disposed on a portion of the surface of the substrate; and
       a coating layer disposed above the surface of the substrate, the coating layer including a color-triggering developer and an opaque pigment, the coating layer obscuring at least a portion of the decorative effect;
    a color precursor composition, comprising a color precursor, and formulated such that upon application of the color precursor composition to the coating layer, contact between the color precursor composition and the opaque pigment causes the initially opaque pigment to change in reflective index as it dissolves into the color-triggering developer, thereby becoming more transparent as compared to its state before contact with the color precursor composition, and contact between the color precursor composition and the color-triggering developer chemically activates or initiates the conversion of the color precursor into chromophores to form and substantially permanently capture a colored mark on the coloring medium; and wherein the one or more decorative effects are visible on the surface of the substrate when the initially opaque pigment becomes relatively more transparent upon application of the color precursor composition to the coating layer.

19. The coloring system of claim 18, wherein the decorative effect comprises at least one of: a holographic pattern visible when the initially opaque pigment becomes more transparent upon application of the color precursor composition to the coating layer; or a distinct decorative layer disposed on one or more portions of the surface of the substrate, the decorative layer including at least one of pearlescent materials, metallic materials, sparkle materials, glitter materials, or luminescent materials.

* * * * *